(12) United States Patent
Kim

(10) Patent No.: US 8,414,204 B2
(45) Date of Patent: Apr. 9, 2013

(54) LENS ADAPTOR

(75) Inventor: Myung-gyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/820,281

(22) Filed: Jun. 22, 2010

(65) Prior Publication Data

US 2011/0013902 A1   Jan. 20, 2011

(30) Foreign Application Priority Data

Jul. 16, 2009   (KR) .................. 10-2009-0064940

(51) Int. Cl.
*G03B 17/00* (2006.01)

(52) U.S. Cl. ....................... 396/530; 359/827

(58) Field of Classification Search ............. 396/530; 359/827

See application file for complete search history.

(56) References Cited

U.S. PATENT DOCUMENTS

| | | | | | |
|---|---|---|---|---|---|
| 3,722,390 | A | * | 3/1973 | Schlapp et al. | 396/71 |
| 4,336,991 | A | * | 6/1982 | Isobe | 396/298 |
| 4,518,239 | A | * | 5/1985 | Tomori | 396/71 |
| 4,525,037 | A | * | 6/1985 | Metabi | 359/740 |
| 4,666,277 | A | * | 5/1987 | Tanaka | 396/505 |

* cited by examiner

*Primary Examiner* — Clayton E LaBalle
*Assistant Examiner* — Fang-Chi Chang
(74) *Attorney, Agent, or Firm* — Drinker Biddle & Reath LLP

(57) ABSTRACT

A lens adaptor includes a first mount formed at one side of the lens adaptor and coupled to a body mount of a lens changeable photographing apparatus, a second mount formed at the other side of the lens adaptor, to which a lens mount of a lens is coupled, an aperture lever arranged to contact an aperture pin of the lens when the lens mount of the lens is coupled to the second mount, and an aperture ring capable of moving the aperture pin of the lens via the aperture lever, due to rotation, when the lens mount of the lens is coupled to the second mount.

15 Claims, 5 Drawing Sheets

LENS ADAPTOR

CROSS-REFERENCE TO RELATED PATENT APPLICATIONS

This application claims the benefit of Korean Patent Application No. 10-2009-0064940, filed on Jul. 16, 2009, in the Korean Intellectual Property Office, the disclosure of which is incorporated herein in its entirety by reference.

BACKGROUND

The various embodiments of the invention relate to a lens adaptor, and more particularly, to a lens adaptor which enables use of a variety of lenses in a lens changeable photographing apparatus and simultaneously improves performance of lenses.

In general, lens changeable photographing apparatuses are photographing apparatuses having lenses that may be freely disassembled and assembled by a user. To obtain a desired result, the user may choose a lens considering various effects of a variety of lenses and couple the chosen lens to a lens changeable photographing apparatus.

In a conventional lens changeable photographing apparatus, since the lens is controlled not electronically, but manually, the user controls the lens by manually turning a focus ring to control focus and/or an aperture ring to control aperture, which are installed on a lens barrel. However, as the use of lens changeable digital photographing apparatuses increases, lenses that are developed to be mounted on the photographing apparatuses do not include aperture rings to control aperture of the lenses. That is, the digital lens changeable photographing apparatus directly controls aperture number of the lens without using the aperture ring. The user may control the aperture number of a lens through a button provided on the digital lens changeable photographing apparatus.

Not all of lenses manufactured by a variety of manufacturers may be mounted in the lens changeable photographing apparatus. That is, when the specifications of a body mount of the lens changeable photographing apparatus where a lens is to be mounted and the specifications of a lens mount of the lens to be mounted on the body mount of the lens changeable photographing apparatus do not correspond to each other, the lens may not be mounted in the lens changeable photographing apparatus. In this case, a lens adaptor is needed. That is, an incompatible lens may be mounted on the lens changeable photographing apparatus only by using a lens adaptor having a mount at one side that may be mounted on the body mount of the lens changeable photographing apparatus and a mount at the other side on which the lens mount of the lens may be mounted.

However, when the conventional lens adaptor is used, it is a problem that a lens having no aperture ring to control aperture is always mounted and used with its aperture opened to a minimum. That is, for the lens having no aperture ring, the aperture number of the lens is controlled by the lens changeable photographing apparatus (body). When the lens changeable photographing apparatus and the lens are coupled via the lens adaptor, the lens changeable photographing apparatus may not control the aperture number of the lens so that the aperture of the lens may always remain opened to a minimum. In this case, the control of the lens aperture to obtain a desired result is impossible so that user convenience is remarkably deteriorated.

SUMMARY

To solve the above and/or other problems, the various embodiments of the invention provide a lens adaptor which enables use of a variety of lenses in a lens changeable photographing apparatus and simultaneously improves performance of lenses.

According to an embodiment of the invention, a lens adaptor includes a first mount formed at one side of the lens adaptor and coupled to a body mount of a lens changeable photographing apparatus, a second mount formed at the other side of the lens adaptor, to which a lens mount of a lens is coupled, an aperture lever arranged to contact an aperture pin of the lens when the lens mount of the lens is coupled to the second mount, and an aperture ring capable of moving the aperture pin of the lens via the aperture lever, due to rotation, when the lens mount of the lens is coupled to the second mount.

The lens adaptor may further include an adaptor holder having a first opening, wherein the first mount includes a second opening and is arranged at one side of the adaptor holder so that the second opening corresponds to the first opening, and the second mount includes a third opening and is arranged at the other side of the adaptor holder so that the third opening corresponds to the first opening.

The lens adaptor may further include a first protruding portion and a second protruding portion arranged on an outer circumferential surface of the adaptor holder to be separated from each other, and an aperture plate coupled to an inner surface of the aperture ring and having a plurality of recess portions and openings formed thereon, wherein at least one of the first and second protruding portions is inserted in the recess portion or opening of the aperture plate.

The aperture ring and the aperture plate may be integrally formed.

When the first protruding portion is inserted in the recess portion or opening of the aperture plate, the second protruding portion may not be inserted in the recess portion or opening of the aperture plate, and when the second protruding portion is inserted in the recess portion or opening of the aperture plate, the first protruding portion may not be inserted in the recess portion or opening of the aperture plate.

As the aperture plate is rotated according to the rotation of the aperture ring, the recess portion or opening of the plurality of recess portions and openings of the aperture plate, in which the first protruding portion or the second protruding portion is inserted, may be changed.

As the recess portion or opening of the plurality of recess portions and openings of the aperture plate, in which the first protruding portion or the second protruding portion is inserted, is changed, an amount of movement of the aperture pin of the lens by the aperture level may be changed when the lens mount of the lens is coupled to the second mount.

The lens adaptor may further include a plurality of protruding portions arranged on the outer circumferential surface of the adaptor holder to be separated from each other, and an aperture plate coupled to an inner surface of the aperture ring and having a first recess portion and a second recess portion are formed thereon, wherein the protruding portion is inserted in at least one of the first recess portion and the second recess portion.

The aperture ring and the aperture plate may be integrally formed.

When one of the protruding portions is inserted in the first recess portion, the rest of the protruding portions may not be inserted in the second recess portion, and when one of the protruding portions is inserted in the second recess portion, the rest of the protruding portions may not be inserted in the first recess portion.

As the aperture plate is rotated according to the rotation of the aperture ring, one of the plurality of protruding portions to be inserted in the first or second recess portion of the aperture plate may be changed.

As the protruding portion of the plurality of protruding portions to be inserted in the first or second recess portion of the aperture plate is changed, an amount of movement of the aperture pin of the lens by the aperture level may be changed when the lens mount of the lens is coupled to the second mount.

The lens adaptor may further include a plurality of protruding portions arranged on an outer circumferential surface of the adaptor holder to be separated from each other, and an aperture plate coupled to an inner surface of the aperture ring and having a first opening and a second opening formed thereon, wherein the protruding portion is inserted in at least one of the first opening and the second opening.

The aperture ring and the aperture plate may be integrally formed.

When one of the protruding portions is inserted in the first opening, the rest of the protruding portions may not be inserted in the second opening, and when one of the protruding portions is inserted in the second opening, the rest of the protruding portions may not be inserted in the first opening.

As the aperture plate is rotated according to the rotation of the aperture ring, one of the plurality of protruding portions inserted in the first or second opening of the aperture plate may be changed.

As the protruding portion of the plurality of protruding portions to be inserted in the first or second opening of the aperture plate is changed, an amount of movement of the aperture pin of the lens by the aperture level may be changed when the lens mount of the lens is coupled to the second mount.

The adaptor holder, the first mount, and the second mount may be integrally formed.

BRIEF DESCRIPTION OF THE DRAWINGS

The above and other features and advantages of the embodiments of the invention will become more apparent by describing in detail exemplary embodiments thereof with reference to the attached drawings in which.

DETAILED DESCRIPTION OF THE EMBODIMENTS

Figure 1:
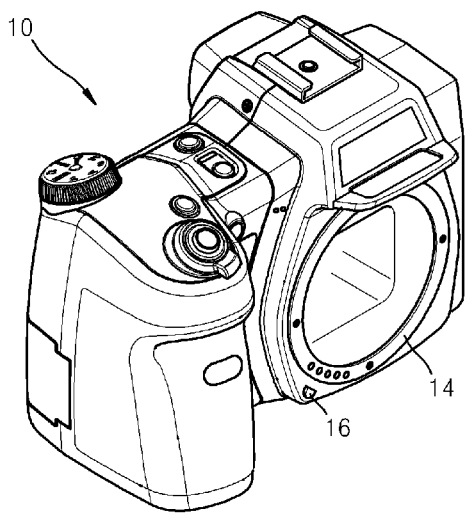
FIG. 1 is a perspective view of a lens changeable photographing apparatus to which a lens adaptor according to an exemplary embodiment of the invention may be coupled.

The attached drawings for illustrating exemplary embodiments of the invention are referred to in order to gain a sufficient understanding of the invention, the merits thereof, and the objectives accomplished by the implementation of the invention. Hereinafter, the invention will be described in detail by explaining exemplary embodiments of the invention with reference to the attached drawings. Like reference numerals in the drawings denote like elements.

Figure 2:
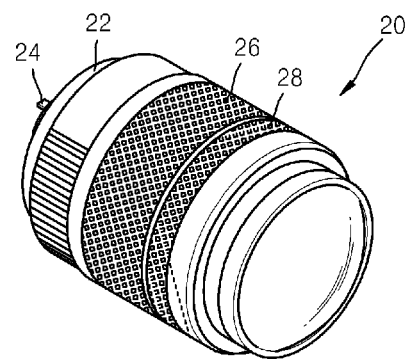
FIG. 2 is a perspective view of a lens that may be coupled to the lens adaptor according to an exemplary embodiment of the invention.
Figure 3:
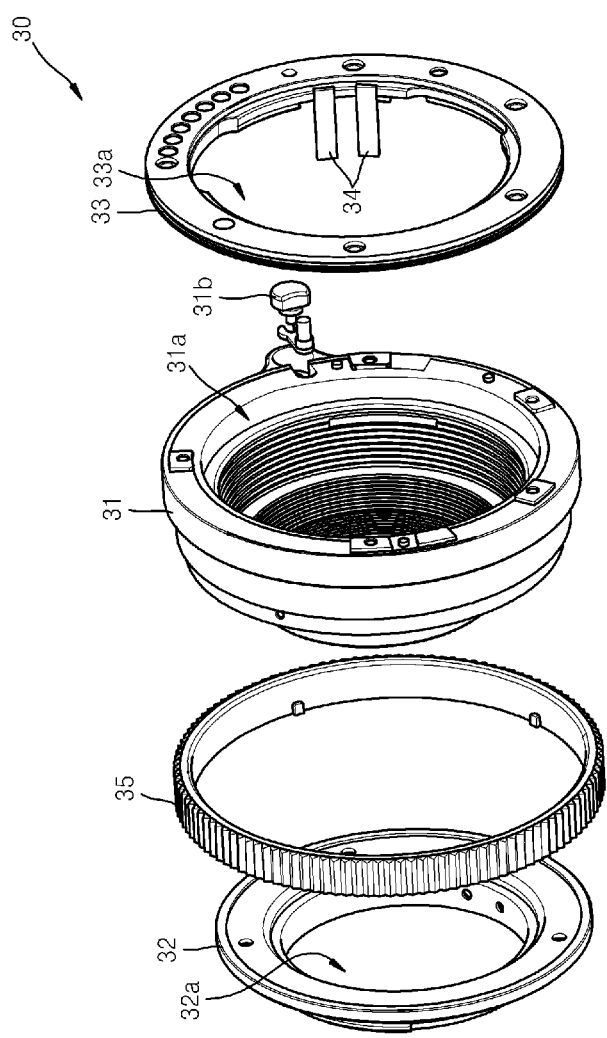
FIG. 3 is an exploded perspective view of a lens adaptor according to an exemplary embodiment of the invention.

FIG. 1 is a perspective view of a lens changeable photographing apparatus 10 to which a lens adaptor 30 according to an exemplary embodiment of the invention may be coupled. FIG. 2 is a perspective view of a lens 20 that may be coupled to the lens adaptor 30. FIG. 3 is an exploded perspective view of the lens adaptor 30.

Referring to FIGS. 1-3, the lens adaptor 30 according to the present exemplary embodiment includes a first mount 32 formed at one side thereof, a second mount 33 formed at the other side thereof, an aperture lever 34, and an aperture ring 35. The first mount 32 may be coupled to a body mount 14 of the lens changeable photographing apparatus 10 of FIG. 1. When the lens adaptor 30 assembled to the lens changeable photographing apparatus 10 is to be disassembled therefrom, the lens adaptor 30 may be disassembled from the lens changeable photographing apparatus 10 by pressing a separation button 16 located around the body mount 14 of the lens changeable photographing apparatus 10.

A lens mount 22 of the lens 20 as illustrated in FIG. 2 may be coupled to a second mount 33 of the lens adaptor 30. When the lens 20 is coupled to the lens adaptor 30 and then disassembled therefrom, the lens 20 may be separated from the lens adaptor 30 in a manner, for example, by turning the lens 20 while pressing a lens separation button 31b located at a side of an adaptor holder 31. Also, the lens 20 may be separated from the lens adaptor 30 in a variety of methods, for example, simply by turning the lens 20 in a state in which the lens separation button 31b is not provided in the adaptor holder 31.

When the lens mount 22 of the lens 20 is coupled to the second mount 33 of the lens adaptor 30, the aperture lever 34 contacts an aperture pin 24 of the lens 20. The aperture lever 34 may be moved by the rotation of the aperture ring 35 so as to move the aperture pin 24 contacting the aperture lever 34.

The lens adaptor 30 may further include the adaptor holder 31 interposed between the first mount 32 and the second mount 33. In this case, the adaptor holder 31 includes a first opening 31a for allowing light input from the lens 20 that is mounted to pass through the lens adaptor 30 and to be incident on a film and/or an imaging device of the lens changeable photographing apparatus 10. The first mount 32 includes a second opening 32a and is arranged at one side of the adaptor holder 31 so that the second opening 32a may correspond to the first opening 31a of the adaptor holder 31. Thus, the light input from the lens 20 that is mounted may pass through the first opening 31a of the adaptor holder 31 and the second opening 32a of the first mount 32. Also, the second mount 33 includes a third opening 33a and is arranged at the other side of the adaptor holder 31 so that the third opening 33a may correspond to the first opening 31a of the adaptor holder 31. Thus, the light input from the lens 20 that is mounted may pass through the third opening 33a of the second mount 33, the first opening 31a of the adaptor holder 31, and the second opening 32a of the first mount 32.

The adaptor holder 31, the first mount 32, and the second mount 33 may be integrally formed, unlike those illustrated in FIG. 3. For convenience of explanation, the adaptor holder 31, the first mount 32, and the second mount 33 are described below as being separated from one another, but the present invention is not limited thereto.

When the conventional lens adaptor is used, it is a problem that a lens having no aperture ring to control aperture is always mounted and operated with its aperture opened to a minimum. That is, the aperture number of the lens having no aperture ring is controlled by the lens changeable photographing apparatus (body). When the lens adaptor is used to couple the lens changeable photographing apparatus and the lens, the lens changeable photographing apparatus may not control the aperture number so that the aperture of the lens may always remain opened to a minimum. In this case, it is impossible to control the lens aperture to obtain a result desired by a user so that user convenience may be remarkably deteriorated.

However, even when the lens 20 is provided with a zoom control ring 26 and a focus control ring 28 only, not an aperture ring to control aperture, a user may directly control the aperture number of the lens 20 by turning the aperture ring 35 of the lens adaptor 30 according to the present exemplary embodiment. Thus, the user may easily and optimally control lens aperture to obtain a desired result so that user convenience may be remarkably improved.

Figure 4:
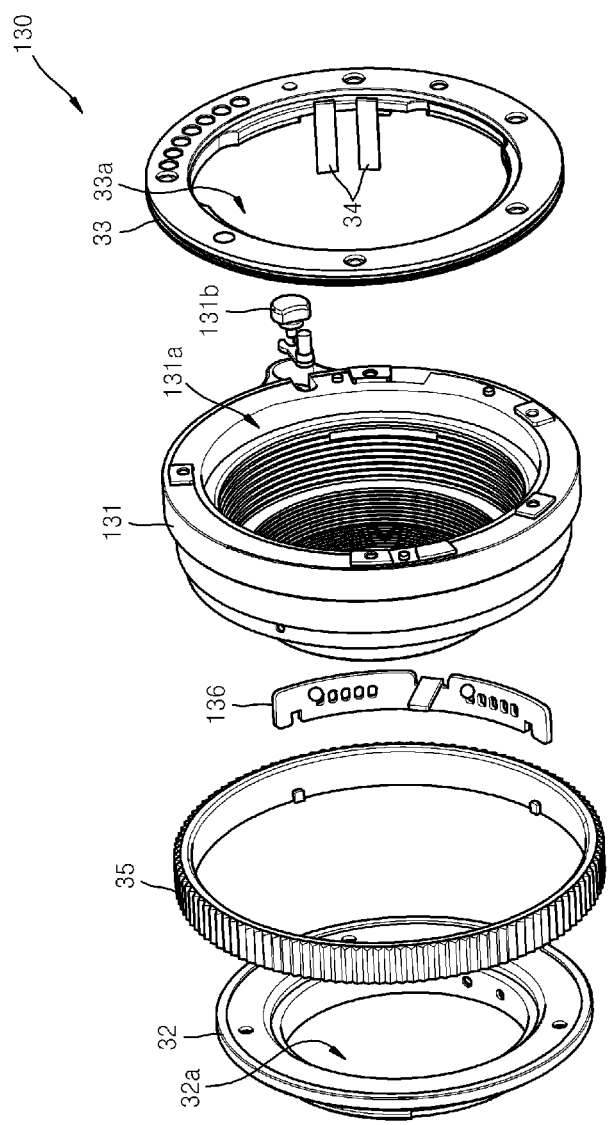
FIG. 4 is an exploded perspective view of a lens adaptor according to another exemplary embodiment of the invention.
Figure 5A:
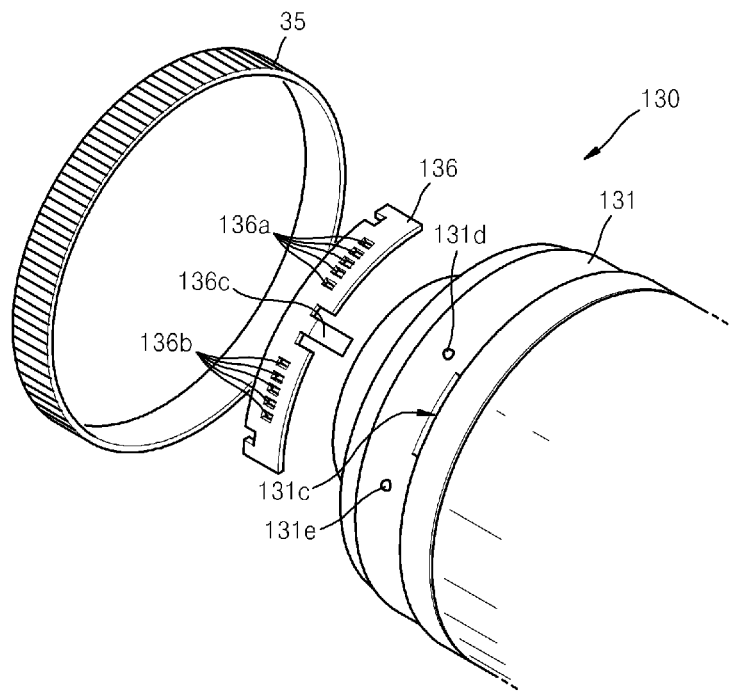
FIG. 5A is a partially enlarged exploded perspective view of the lens adaptor of FIG. 4.
Figure 5B:
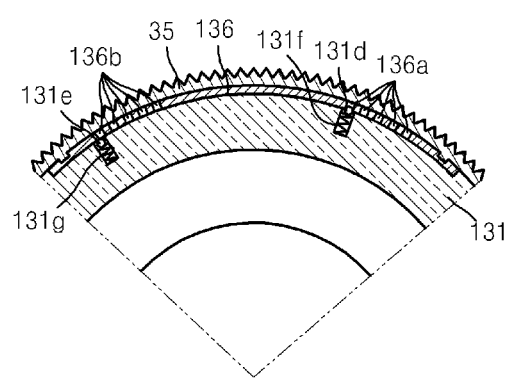
FIG. 5B is a partially enlarged cross-sectional view of the lens adaptor of FIG. 4.

FIG. 4 is an exploded perspective view of a lens adaptor 130 according to another exemplary embodiment of the present invention. FIG. 5A is a partially enlarged exploded perspective view of the lens adaptor 130 of FIG. 4. FIG. 5B is a partially enlarged cross-sectional view of the lens adaptor 130 of FIG. 4.

Referring to FIGS. 4-5B, the lens adaptor 130 according to the present exemplary embodiment further includes an aperture plate 136, a first protruding portion 131d, and a second protruding portion 131e, in addition to the constituent elements of the lens adaptor 30 of FIG. 3. The aperture plate 136 is coupled to the inner surface of the aperture ring 35 and includes a plurality of openings 136a and 136b. Although the above drawings illustrate that the openings 136a and 136b are formed in the aperture plate 136, a plurality of recess portions instead of the openings 136a and 136b may be formed in the aperture plate 136. In the following description, forming of the openings 136a and 136b is described for convenience of explanation. The aperture ring 35 and the aperture plate 136 may be integrally formed unlike those illustrated in FIG. 4. When the aperture ring 35 and the aperture plate 136 are integrally formed, a plurality of recess portions are substantially formed in the inner surface of the aperture ring 35. The first and second protruding portions 131d and 131e are arranged on the outer circumferential surface of an adaptor holder 131 to be separated from each other. The first and second protruding portions 131d and 131e may be steel balls and elastically supported by click springs 131f and 131g respectively located under the first and second protruding portions 131d and 131e.

In the lens adaptor 130 of the present exemplary embodiment, at least one of the first and second protruding portions 131d and 131e are inserted in the openings 136a and 136b of the aperture plate 136. Accordingly, as the aperture ring 35 rotates so that the aperture plate 136 is rotated, the openings 136a and 136b of the aperture plate 136, in which the first protruding portion 131d and/or the second protruding portion 131e are inserted, are changed. As the opening of the aperture plate 136, in which the first protruding portion 131d or the second protruding portion 131e is inserted, is changed, when the lens mount 22 of the lens 20 is coupled to the second mount 33 of the lens adaptor 130, the amount of movement of the aperture pin 24 of the lens 20 by the aperture lever 34 changes so that a degree of opening of the aperture of the lens 20 may be changed.

When the openings 136a and 136b of the aperture plate 136, in which the first protruding portion 131d or the second protruding portion 131e is inserted, is changed as a user turns the aperture ring 35, the user senses a click sound and/or vibration through the aperture ring 35. Accordingly, whenever turning the aperture ring 35, the user may know how much the aperture ring 35 rotates.

While the adaptor holder 131 includes a slit 131c, the aperture plate 136 includes a bent portion 136c. Since the bent portion 136c contacts the aperture lever 34 through the slit 131c of the adaptor holder 131, the aperture lever 34 may be also moved as the aperture ring 35 is rotated. This may be applied to the above-described lens adaptor 30 of FIG. 3.

When the first protruding portion 131d is inserted in any of the openings 136a and 136b of the aperture plate 136, the second protruding portion 131e may not be inserted in the openings 136a and 136b of the aperture plate 136. Also, when the second protruding portion 131e is inserted in any of the openings 136a and 136b of the aperture plate 136, the first protruding portion 131d may not be inserted in the openings 136a and 136b of the aperture plate 136. In this case, compared to a case in which, when the first protruding portion 131d is inserted in the opening 136a of the aperture plate 136, the second protruding portion 131e is inserted in the opening 136b of the aperture plate 136, the number of clicks within the same rotational angle of the aperture ring 35, that is, the number of insertions of the protruding portions 131d and 131e in the openings 136a and 136b of the aperture ring 35 when the aperture ring 35 is turned, may be remarkably increased. Accordingly, when the lens 20 is coupled to the lens adaptor 130, a degree of opening of the aperture of the lens 20 may be finely controlled.

Figure 6A:
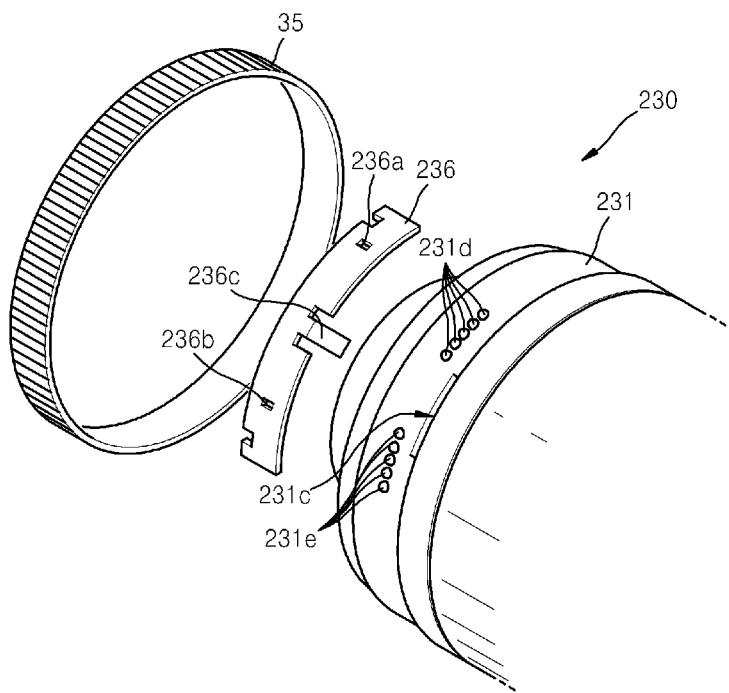
FIG. 6A is a partially enlarged exploded perspective view of a lens adaptor according to another exemplary embodiment of the invention.
Figure 6B:
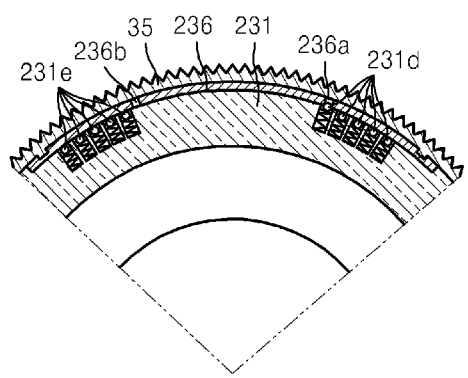
FIG. 6B is a partially enlarged cross-sectional view of the lens adaptor of FIG. 6A.

FIG. 6A is a partially enlarged exploded perspective view of a lens adaptor 230 according to another exemplary embodiment of the invention. FIG. 6B is a partially enlarged cross-sectional view of the lens adaptor 230 of FIG. 6A.

Referring to FIGS. 6A and 6B, the lens adaptor 230 of the present exemplary embodiment further includes an aperture plate 236 and a plurality of protruding portions 231d and 231e, unlike the lens adaptor 30 of FIG. 3. The aperture plate 236 is coupled to the inner surface of the aperture ring 35 and a first opening 236a and a second opening 236b are formed in the aperture plate 236. Although the above drawings illustrate that the first opening 236a and the second opening 236b are formed in the aperture plate 236, a first recess portion and a second recess portion instead of the first opening 236a and the second opening 236b may be formed in the aperture plate 236. In the following description, a case of forming the first opening 236a and the second opening 236b are described for convenience of explanation. The aperture ring 35 and the aperture plate 236 may be integrally formed unlike those illustrated in FIG. 6A. When the aperture ring 35 and the aperture plate 236 are integrally formed, the first and second recess portions may be formed in the inner surface of the aperture ring 35. The protruding portions 231d and 231e are arranged on the outer circumferential surface of an adaptor holder 231 to be separated from each other.

In the lens adaptor 230 of the present exemplary embodiment, at least one of the first and second protruding portions 231d and 231e are inserted in the first and second openings 236a and 236b of the aperture plate 236. Accordingly, as the aperture ring 35 rotates so that the aperture plate 236 are rotated, the first and second protruding portion 231d and 231e inserted in the first opening 236a and/or the second opening 236b are changed. As the first and second protruding portions 231d and 231e inserted in the first opening 236a and/or the second opening 236b of the aperture plate 236 are changed, when the lens mount 22 of the lens 20 is coupled to the second mount 33, the amount of movement of the aperture pin 24 of the lens 20 by the aperture lever 34 changes so that a degree of opening of the aperture of the lens 20 may be changed.

When the first and second protruding portions 231d and 231e inserted in the first opening 236a and/or the second opening 236b of the aperture plate 236 are changed as a user turns the aperture ring 35, the user senses a click sound and/or vibration through the aperture ring 35. Accordingly, whenever turning the aperture ring 35, the user may know how much the aperture ring 35 rotates.

While the adaptor holder 231 includes a slit 231c, the aperture plate 236 includes a bent portion 236c. Since the bent portion 236c contacts the aperture lever 34 through the slit 231c of the adaptor holder 231, the aperture lever 34 may be also moved as the aperture ring 35 is rotated.

When the first protruding portion 231d is inserted in the first openings 236a, the second protruding portion 231e may not be inserted in the second opening 236b. Also, when the second protruding portion 231e is inserted in the second openings 236b, the first protruding portion 231d may not be inserted in the first opening 236a. In this case, compared to a case in which, when the first protruding portion 231d is inserted in the first opening 236a, the second protruding portion 231e is inserted in the second opening 236b, the number of clicks within the same rotational angle of the aperture ring 35, that is, the number of insertions of the protruding portions 231d and 231e in the openings 236a and 236b of the aperture ring 35 when the aperture ring 35 is turned, may be remarkably increased. Accordingly, when the lens 20 is coupled to the lens adaptor 230, a degree of opening of aperture of the lens 20 may be finely controlled.

As described above, a variety of lenses may be coupled to a lens changeable photographing apparatus and simultaneously performance of lenses is improved.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. Furthermore, the invention could employ any number of conventional techniques.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A lens adaptor to couple a lens to a lens changeable photographing apparatus, the lens adaptor comprising:
a first mount formed at one side of the lens adaptor and coupleable to a body mount of the lens changeable photographing apparatus;
a second mount formed at the other side of the lens adaptor opposite the one side of the lens adaptor, to which a lens mount of a lens is coupleable;
an aperture lever arranged to contact an aperture pin of the lens when the lens mount of the lens is coupled to the second mount;
an aperture ring capable of moving the aperture pin of the lens via the aperture lever due to manual rotation of the aperture ring, when the lens mount of the lens is coupled to the second mount;
an adaptor holder having a first opening;
a first protruding portion and a second protruding portion arranged on an outer circumferential surface of the adaptor holder to be separated from each other; and
an aperture plate coupled to an inner surface of the aperture ring and having a plurality of recess portions or openings formed thereon,
wherein the first mount includes a second opening and is arranged at the one side of the adaptor holder so that the second opening corresponds to the first opening, and the second mount includes a third opening and is arranged at the other side of the adaptor holder so that the third opening corresponds to the first opening, and
wherein at least one of the first and second protruding portions is inserted in the recess portion or opening of the aperture plate.

2. The lens adaptor of claim 1, wherein the aperture ring and the aperture plate are integrally formed.

3. The lens adaptor of claim 1, wherein, when the first protruding portion is inserted in the recess portion or opening of the aperture plate, the second protruding portion is not inserted in the recess portion or opening of the aperture plate, and when the second protruding portion is inserted in the recess portion or opening of the aperture plate, the first protruding portion is not inserted in the recess portion or opening of the aperture plate.

4. The lens adaptor of claim 3, wherein, as the aperture plate is rotated according to the rotation of the aperture ring, the recess portion or opening of the plurality of recess portions or openings of the aperture plate, in which the first protruding portion or the second protruding portion is inserted, is changed.

5. The lens adaptor of claim 4, wherein, as the recess portion or opening of the plurality of recess portions or openings of the aperture plate, in which the first protruding portion or the second protruding portion is inserted, is changed, an amount of movement of the aperture pin of the lens by the aperture level is changed when the lens mount of the lens is coupled to the second mount.

6. A lens adaptor to couple a lens to a lens changeable photographing apparatus, the lens adaptor comprising:
  a first mount formed at one side of the lens adaptor and coupleable to a body mount of the lens changeable photographing apparatus;
  a second mount formed at the other side of the lens adaptor opposite the one side of the lens adaptor, to which a lens mount of a lens is coupleable;
  an aperture lever arranged to contact an aperture pin of the lens when the lens mount of the lens is coupled to the second mount;
  an aperture ring capable of moving the aperture pin of the lens via the aperture lever due to manual rotation of the aperture ring, when the lens mount of the lens is coupled to the second mount;
  an adaptor holder having a first opening;
  a plurality of protruding portions arranged on the outer circumferential surface of the adaptor holder to be separated from each other; and
  an aperture plate coupled to an inner surface of the aperture ring and having a first recess portion and a second recess portion are formed thereon,
  wherein the first mount includes a second opening and is arranged at the one side of the adaptor holder so that the second opening corresponds to the first opening, and the second mount includes a third opening and is arranged at the other side of the adaptor holder so that the third opening corresponds to the first opening, and
  wherein at least one of the plurality of protruding portions is inserted in at least one of the first recess portion and the second recess portion.

7. The lens adaptor of claim 6, wherein the aperture ring and the aperture plate are integrally formed.

8. The lens adaptor of claim 6, wherein, when one of the protruding portions is inserted in the first recess portion, the rest of the protruding portions are not inserted in the second recess portion, and when one of the protruding portions is inserted in the second recess portion, the rest of the protruding portions are not inserted in the first recess portion.

9. The lens adaptor of claim 8, wherein, as the aperture plate is rotated according to the rotation of the aperture ring, one of the plurality of protruding portions to be inserted in the first or second recess portion of the aperture plate is changed.

10. The lens adaptor of claim 9, wherein, as the protruding portion of the plurality of protruding portions to be inserted in the first or second recess portion of the aperture plate is changed, an amount of movement of the aperture pin of the lens by the aperture level is changed when the lens mount of the lens is coupled to the second mount.

11. A lens adaptor to couple a lens to a lens changeable photographing apparatus, the lens adaptor comprising:
  a first mount formed at one side of the lens adaptor and coupleable to a body mount of the lens changeable photographing apparatus;
  a second mount formed at the other side of the lens adaptor opposite the one side of the lens adaptor, to which a lens mount of a lens is coupleable;
  an aperture lever arranged to contact an aperture pin of the lens when the lens mount of the lens is coupled to the second mount;
  an aperture ring capable of moving the aperture pin of the lens via the aperture lever due to manual rotation of the aperture ring, when the lens mount of the lens is coupled to the second mount;
  an adaptor holder having a first opening;
  a plurality of protruding portions arranged on an outer circumferential surface of the adaptor holder to be separated from each other; and
  an aperture plate coupled to an inner surface of the aperture ring and having a fourth opening and a fifth opening formed thereon,
  wherein the first mount includes a second opening and is arranged at the one side of the adaptor holder so that the second opening corresponds to the first opening, and the second mount includes a third opening and is arranged at the other side of the adaptor holder so that the third opening corresponds to the first opening, and
  wherein at least one of the plurality of protruding portions is inserted in at least one of the fourth opening and the fifth opening.

12. The lens adaptor of claim 11, wherein the aperture ring and the aperture plate are integrally formed.

13. The lens adaptor of claim 11, wherein, when one of the protruding portions is inserted in the first opening, the rest of the protruding portions are not inserted in the second opening, and when one of the protruding portions is inserted in the second opening, the rest of the protruding portions are not inserted in the first opening.

14. The lens adaptor of claim 13, wherein, as the aperture plate is rotated according to the rotation of the aperture ring, one of the plurality of protruding portions inserted in the first or second opening of the aperture plate is changed.

15. The lens adaptor of claim 14, wherein, as the protruding portion of the plurality of protruding portions to be inserted in the first or second opening of the aperture plate is changed, an amount of movement of the aperture pin of the lens by the aperture level is changed when the lens mount of the lens is coupled to the second mount.

* * * * *